(12) United States Patent
Matsumoto

(10) Patent No.: US 9,484,788 B2
(45) Date of Patent: Nov. 1, 2016

(54) ROTARY-ELECTRIC-MACHINE TEMPERATURE ESTIMATION SYSTEM FOR VEHICLE

(71) Applicant: Toyota Jidosha Kabushiki Kaisha, Toyota-shi Aichi-ken (JP)

(72) Inventor: Takashi Matsumoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 117 days.

(21) Appl. No.: 14/453,771

(22) Filed: Aug. 7, 2014

(65) Prior Publication Data

US 2015/0042184 A1 Feb. 12, 2015

(30) Foreign Application Priority Data

Aug. 9, 2013 (JP) .................................. 2013-167101

(51) Int. Cl.
*H02K 9/19* (2006.01)

(52) U.S. Cl.
CPC ............. *H02K 9/19* (2013.01); *H02K 2213/09* (2013.01)

(58) Field of Classification Search
CPC ............................ H02K 9/19; H02K 2213/09
See application file for complete search history.

(56) References Cited

U.S. PATENT DOCUMENTS

| 6,636,377 | B1 * | 10/2003 | Yu | G11B 5/59605 360/78.06 |
| 7,743,860 | B2 * | 6/2010 | Soliman | B60K 6/442 180/65.265 |
| 2009/0265066 | A1 * | 10/2009 | Ogawa | F16H 61/12 701/55 |
| 2011/0060488 | A1 * | 3/2011 | Nakazawa | B66F 9/20 701/22 |
| 2011/0316455 | A1 * | 12/2011 | Maruyama | H02P 29/0044 318/373 |

FOREIGN PATENT DOCUMENTS

| JP | 2010-148322 A | 7/2010 |
| JP | 2013-040783 A | 2/2013 |
| JP | 2013-050354 A | 3/2013 |

* cited by examiner

*Primary Examiner* — Rodney Butler
*Assistant Examiner* — Frederick Brushaber
(74) *Attorney, Agent, or Firm* — Dinsmore & Shohl LLP

(57) ABSTRACT

Provided is a rotary-electric-machine temperature estimation system for a vehicle. The temperature estimation system includes a rotary electric machine, a cooler, a temperature sensor, and a controller. The rotary electric machine is fixed to a vehicle body of the vehicle and provided in the vehicle. The rotary electric machine includes a stator coil. The cooler has an injection outlet for injecting refrigerant, and cools off the stator coil by the refrigerant thus injected from the injection outlet. The temperature sensor measures a temperature of the stator coil. The controller estimates an actual temperature of the stator coil by use of the measured temperature and a preset temperature correction value. The controller changes the temperature correction value according to a change in a posture of the vehicle body.

11 Claims, 8 Drawing Sheets

LEFT DIRECTION ←→ RIGHT DIRECTION
VEHICLE FRONT-REAR DIRECTION (IN CASE OF BACKWARD TILTING)

(IN CASE OF FORWARD TILTING)

FIG. 6

| TORQUE Tri | SENSOR MEASURED TEMPERATURE VARIATION IN (t2 − t1) | | | | | |
|---|---|---|---|---|---|---|
| | | -A2 | -A1 | 0 | A1 | A2 | ⋯ |
| B1 | ⋮ | ΔT11a | ΔT12a | ΔT13a | ΔT14a | ΔT15a | ⋮ |
| B2 | ⋮ | ΔT21a | ΔT22a | ΔT23a | ΔT24a | ΔT25a | ⋮ |
| B3 | ⋮ | ΔT31a | ΔT32a | ΔT33a | ΔT34a | ΔT35a | ⋮ |
| B4 | ⋮ | ΔT41a | ΔT42a | ΔT43a | ΔT44a | ΔT45a | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

M1, ΔTna

FIG. 7

| TORQUE Tri | SENSOR MEASURED TEMPERATURE VARIATION IN (t2 − t1) | | | | | | |
|---|---|---|---|---|---|---|---|
| | | −A2 | −A1 | 0 | A1 | A2 | ⋯ |
| 0 | | ΔT01b | ΔT02b | ΔT03b | ΔT04b | ΔT05b | ⋯ |
| −B1 | | ΔT11b | ΔT12b | ΔT13b | ΔT14b | ΔT15b | ⋯ |
| −B2 | | ΔT21b | ΔT22b | ΔT23b | ΔT24b | ΔT25b | ⋯ |
| −B3 | | ΔT31b | ΔT32b | ΔT33b | ΔT34b | ΔT35b | ⋯ |
| ⋮ | | ⋮ | ⋮ | ⋮ | ⋮ | ⋮ | ⋮ |
| ⋮ | | ⋮ | ⋮ | ⋮ | ⋮ | ⋮ | ⋮ |
| ⋮ | | ⋮ | ⋮ | ⋮ | ⋮ | ⋮ | ⋮ |

M2

ΔTnb

ROTARY-ELECTRIC-MACHINE TEMPERATURE ESTIMATION SYSTEM FOR VEHICLE

INCORPORATION BY REFERENCE

The disclosure of Japanese Patent Application No. 2013-167101 filed on Aug. 9, 2013 including the specification, drawings and abstract is incorporated herein by reference in its entirety.

BACKGROUND OF THE INVENTION

1. Field of the Invention

The present invention relates to a rotary-electric-machine temperature estimation system for a vehicle, which temperature estimation system includes: a rotary electric machine provided in a vehicle body so as to be fixed thereto and including a stator coil; a cooler configured to cool off the stator coil; and a temperature sensor configured to measure a temperature of the stator coil.

2. Description of Related Art

In an electric vehicle including a rotary electric machine, a fuel cell-powered vehicle, or a hybrid vehicle including a rotary electric machine and an engine, a temperature of a coil included in the rotary electric machine is measured so as to detect defects or improve performance.

Japanese Patent Application Publication No. 2013-40783 (JP 2013-40783 A) describes a rotary-electric-machine temperature estimation system for a vehicle. The temperature estimation system includes a rotary electric machine provided in a vehicle and including a stator coil, a cooler configured to inject refrigerant and to cool off the stator coil by the refrigerant, and a temperature sensor configured to measure a temperature of the stator coil. In this configuration, an actual temperature of the stator coil is estimated according to a torque acquisition value of the rotary electric machine, a variation in measured temperature of the temperature sensor, and a temperature correction value associated with the torque acquisition value and the variation in measured temperature.

SUMMARY OF THE INVENTION

In the configuration described in JP 2013-40783 A, when a posture of a vehicle body is changed, positions (a posture difference) of the temperature sensor fixed to the vehicle body and the cooler are changed. This changes a contact state of the refrigerant injected from the cooler with respect to a part to be measured by the temperature sensor, and a contact path in which the refrigerant is injected from the cooler and makes contact with the part to be measured by the temperature sensor. Hereby, a measured temperature of the temperature sensor is changed according to the posture of the vehicle body, which may decrease estimation accuracy of the actual temperature of the stator coil.

An object of the present invention is to provide a rotary-electric-machine temperature estimation system for a vehicle which temperature estimation system is able to improve estimation accuracy of an actual temperature of a stator coil.

An aspect of the present invention relates to a rotary-electric-machine temperature estimation system for a vehicle. The temperature estimation system includes a rotary electric machine, a cooler, a temperature sensor, and a controller. The rotary electric machine is fixed to a vehicle body of the vehicle and provided in the vehicle. The rotary electric machine includes a stator coil. The cooler has an injection outlet for injecting refrigerant, and the cooler cools off the stator coil by the refrigerant thus injected from the injection outlet. The temperature sensor measures a temperature of the stator coil. The controller estimates an actual temperature of the stator coil by use of the measured temperature and a preset temperature correction value. The controller changes the temperature correction value according to a change in a posture of the vehicle body.

In the above aspect, the controller may acquire a torque value of the rotary electric machine, and the controller may change the temperature correction value according to a change in the torque value while the torque value is a positive value and according to a change in the torque value while the torque value is a negative value. The torque value indicates whether an orientation of the posture of the vehicle body is a backward-tilting direction or a forward-tilting direction. The change in the torque value indicates a change in the posture of the vehicle body between the backward-tilting direction and the forward-tilting direction.

In the above aspect, the temperature estimation system may include an operating portion. The operation portion is provided in the vehicle and instructs changeover between forward movement and rearward movement of the vehicle by operation. The controller may acquire an operation position of the operating portion, and the controller may change the temperature correction value according to a change in the operation position. The operation position indicates whether an orientation of the posture of the vehicle body is a backward-tilting direction or a forward-tilting direction. The change in the operation position indicates a change in the posture of the vehicle body between the backward-tilting direction and the forward-tilting direction.

In the above aspect, the temperature correction value may be defined according to a torque value of the rotary electric machine and a variation in the measured temperature.

In the above aspect, the controller store therein data of a plurality of maps. The maps each may indicate a relationship among a torque value of the rotary electric machine, a variation in the measured temperature, and the temperature correction value. The plurality of maps may include a first map and a second map. The first map indicates a relationship among a positive torque value, the variation in the measured temperature, and the temperature correction value. The second map indicates a relationship among a negative torque value including a torque value of zero, the variation in the measured temperature, and the temperature correction value. The controller may select one map from the plurality of maps according to a change in the vehicle body, calculate the temperature correction value based on the torque value and the variation in the measured temperature with reference to data of the map thus selected, and estimate an actual temperature of the stator coil in a predetermined reference posture of the vehicle body by use of the measured temperature and the temperature correction value.

In the above aspect, the controller store therein data of a plurality of maps. The maps may each indicate a relationship among the torque value of the rotary electric machine, a variation in the measured temperature, and the temperature correction value. The plurality of maps may include a first map and a second map. The first map indicates a relationship among a positive torque value, the variation in the measured temperature, and the temperature correction value. The second map indicates a relationship among a negative torque value including a torque value of zero, the variation in the measured temperature, and the temperature correction value. The controller may select one map from the plurality of maps according to a change in the torque value, the controller may calculate the temperature correction value based on the torque value and the variation in the measured temperature with reference to data of the map thus selected, and the controller may estimate an actual temperature of the stator coil in a predetermined reference posture of the vehicle body by use of the measured temperature and the temperature correction value.

In the above aspect, the controller store therein data of a plurality of maps. The maps may each indicate a relationship among a torque value of the rotary electric machine, a variation in the measured temperature, and the temperature correction value. The plurality of maps may include a first map and a second map. The first map indicates a relationship among a positive torque value, the variation in the measured temperature, and the temperature correction value. The second map indicates a relationship among a negative torque value including a torque value of zero, the variation in the measured temperature, and the temperature correction value. The controller may select one map from the plurality of maps according to a change in the operation position, the controller may calculate the temperature correction value based on the torque value and the variation in the measured temperature with reference to data of the map thus selected, and the controller may estimate an actual temperature of the stator coil in a predetermined reference posture of the vehicle body by use of the measured temperature and the temperature correction value.

Another aspect of the present invention relates to a rotary-electric-machine temperature estimation system for a vehicle. The temperature estimation system includes a rotary electric machine, a cooler, a temperature sensor, and a controller. The rotary electric machine is provided in a vehicle body of the vehicle so as to be fixed thereto and includes a stator coil. The cooler has an injection outlet for injecting refrigerant, and cools off the stator coil by the refrigerant thus injected from the injection outlet. The temperature sensor measures a temperature of the stator coil. The controller may have data of a plurality of maps. The maps each indicate a relationship among a torque value of the rotary electric machine, a variation in the measured temperature, and a temperature correction value, and the plurality of maps includes a first map and a second map. The first map is referred to at the time when an orientation of a posture of the vehicle body is a backward-tilting direction. The second map is referred to at the time when the orientation of the posture of the vehicle body is a forward-tilting direction. The controller acquires an acquisition value indicative of whether the orientation of the posture of the vehicle body is the backward-tilting direction or the forward-tilting direction, and selects one map from the plurality of maps according to the acquisition value. The controller calculates the temperature correction value based on the torque value and the variation in the measured temperature of the temperature sensor with reference to data of the map thus selected, and estimates an actual temperature of the stator coil in a predetermined reference posture of the vehicle body by use of the measured temperature and the temperature correction value.

In the above aspect, when that actual temperature of the stator coil which is estimated by the controller is a predetermined temperature or more, the controller may restrict driving of the rotary electric machine.

According to the rotating-electrical-machine temperature estimation system for a vehicle, according to the above aspect of the present invention, the temperature correction value to be used for an actual temperature estimation of the stator coil is changed according to a change in the posture of the vehicle body. This accordingly makes it possible to improve estimation accuracy of the actual temperature of the stator coil in a case where the vehicle body is tilted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a view illustrating a first map to be used in the rotary-electric-machine temperature estimation system of FIG. 1;

FIG. 7 is a view illustrating a second map to be used in the rotary-electric-machine temperature estimation system of FIG. 1;

DETAILED DESCRIPTION OF EMBODIMENTS

An embodiment of a rotary-electric-machine temperature estimation system for a vehicle according to the present invention will be described below with reference to the drawings. The following description deals with a case where an actual temperature of a stator coil of a motor generator provided in a hybrid vehicle 10 as a coil of a rotary electric machine is estimated. However, it is possible to estimate an actual temperature of a stator coil of a drive motor provided in a vehicle except for the hybrid vehicle, e.g., an electric vehicle or a fuel-cell vehicle. In the following descriptions about the drawings, the same reference sign is referred to a similar constituent.

Figure 1:
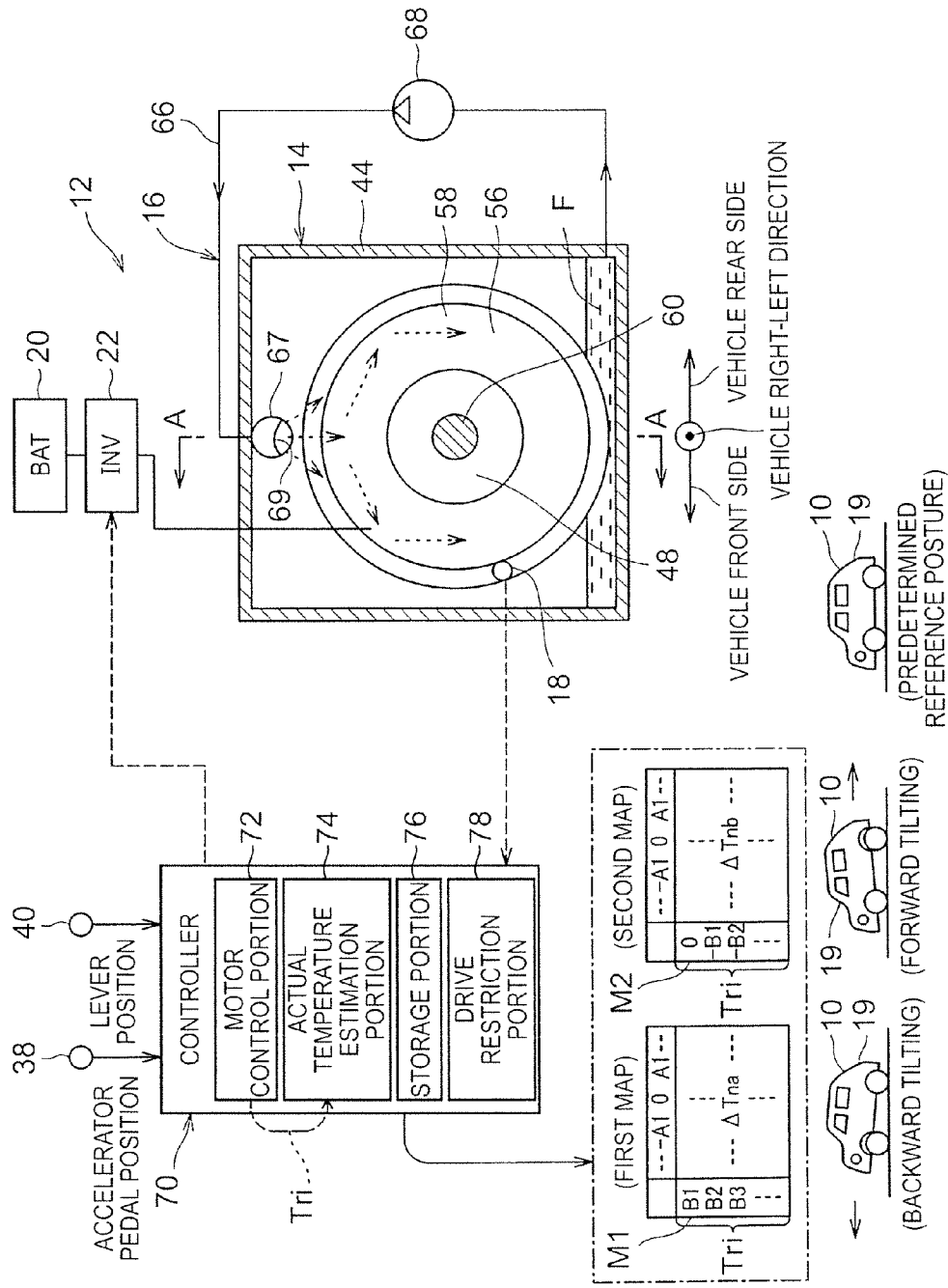
FIG. 1 is a view illustrating an essential configuration of a rotary-electric-machine temperature estimation system for a vehicle, according to an embodiment of the present invention.
Figure 2:
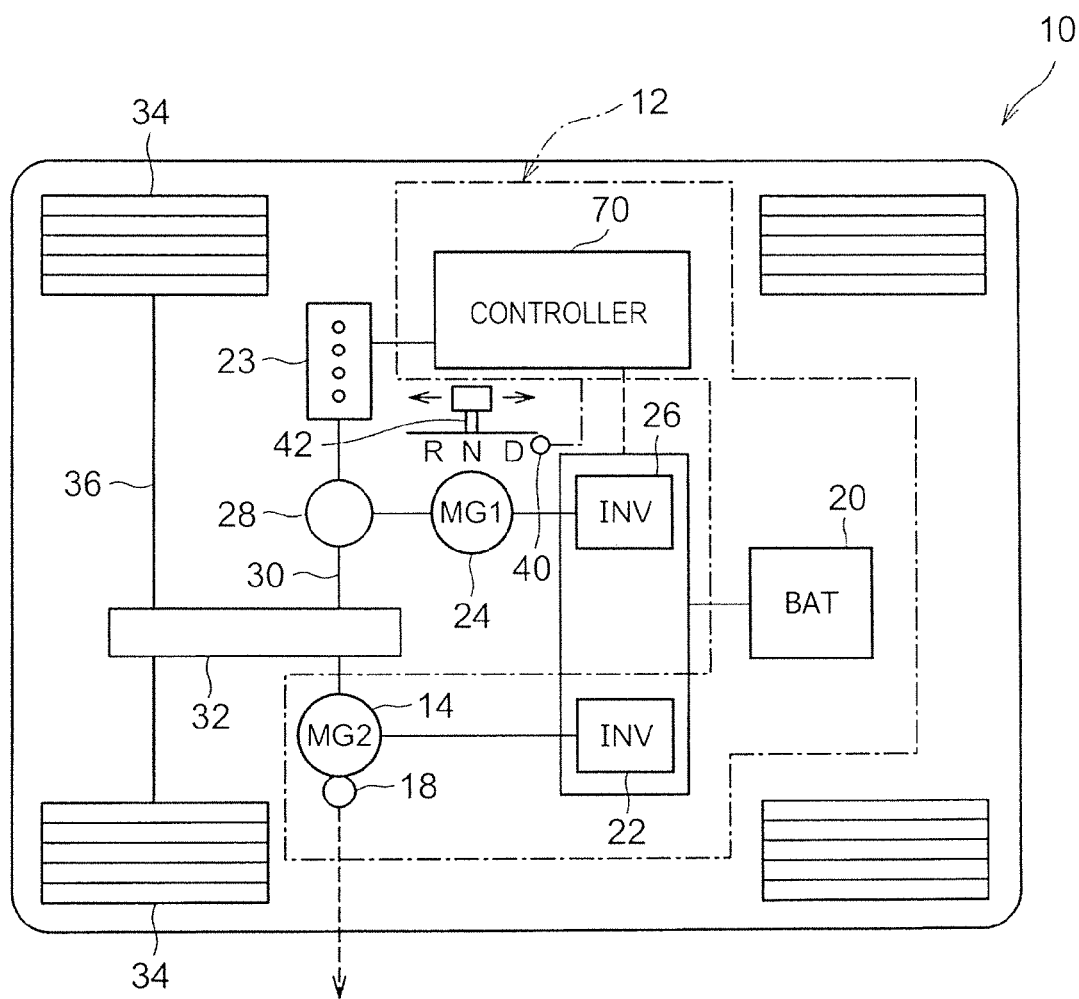
FIG. 2 is a view illustrating a configuration of the vehicle including the rotary-electric-machine temperature estimation system of FIG. 1.

FIG. 1 illustrates an essential configuration of the rotary-electric-machine temperature estimation system (hereinafter just referred to as "temperature estimation system") 12 for a vehicle, according to the embodiment of the present invention. The temperature estimation system 12 includes a second motor generator 14, a cooler 16, a temperature sensor 18, a controller 70, a battery 20, and a second inverter 22. As illustrated in FIG. 2, which will be described later, the temperature estimation system 12 is used in such a manner that the temperature estimation system 12 is provided in the hybrid vehicle 10. As will be described later, the controller 70 changes a temperature correction value to be used for an actual temperature estimation of a stator coil of the second motor generator 14 according to a change in an acquisition value indicative of an orientation of a posture of a vehicle body 19. This makes it possible to improve estimation accuracy of an actual temperature of the stator coil in a case where the vehicle body 19 is tilted. This will be described later, more specifically.

Initially, with reference to FIG. 2, an overall configuration of the hybrid vehicle 10 in which the temperature estimation system 12 is provided is described. After that, with reference to FIGS. 1, 3, the controller 70, the cooler 16, and the temperature sensor 18 constituting the temperature estimation system 12 will be described.

The hybrid vehicle 10 includes the temperature estimation system 12, an engine 23, a first motor generator 24, and a first inverter 26 configured to drive the first motor generator 24. Hereinafter, the first motor generator 24 is referred to as the "first MG 24," and the second motor generator 14 is referred to as the "second MG 14."

The first MG 24 is a three-phase synchronous motor, and has a function as a start-up motor for the engine 23. The first MG 24 also has a function as a generator driven by the engine 23. In this case, at least part of a torque from the engine 23 is transmitted to a rotating shaft of the first MG 24 via a power distribution mechanism 28. An electric power generated by the first MG 24 is supplied to the battery 20 via the first inverter 26, so that the battery 20 is charged.

The second MG 14 is a three-phase synchronous motor, and has a function as a drive motor to which an electric power from the battery 20 is supplied so as to generate a driving force of the vehicle. The second MG 14 also has a function as a generator for electric power regeneration. An electric power generated by the second MG 14 is supplied to the battery 20 via the second inverter 22, so that the battery 20 is charged.

A three-phase induction motor can be used as the first MG 24 and the second MG 14. A configuration of the second MG 14 will be described later in detail.

The first inverter 26 and the second inverter 22 each include a plurality of switching elements. A control signal based on a torque command value is input into either one or both of the inverters 26, 22 from the after-mentioned controller 70, so that switching of the switching elements is controlled.

A DC/DC converter (not shown) may be provided between the battery 20 and the inverters 26, 22, so that a voltage of the battery 20 is increased and supplied to each of the inverter 26, 22 and a voltage supplied from the inverters 26, 22 is decreased to charge the battery 20.

The power distribution mechanism 28 is constituted by a planet gear mechanism. The planet gear mechanism includes a sun gear, a pinion gear, a carrier, and a ring gear. For example, the sun gear is connected to an end of a hollow rotating shaft of the first MG 24. The carrier is connected to a drive shaft of the engine 23. The ring gear is connected to an output shaft 30, and the output shaft 30 is connected to a rotating shaft of the second MG 14 directly or via a speed reducer including another planet gear mechanism (not shown). The output shaft 30 is connected to a drive shaft 36 connected to wheel assemblies 34 via a speed reducer 32.

The power distribution mechanism 28 divides a power from the engine 23 into a path to the drive shaft 36 on an output-shaft-30 side and a path to the first MG 24.

The controller 70 is called an electronic control unit (ECU), and includes a microcomputer having a CPU, and a memory. In an example illustrated herein, only one controller 70 is illustrated as the controller 70, but the controller 70 may be divided into a plurality of constituents appropriately so that the plurality of constituents is electrically connected to each other.

Detection signals indicative of an operation position of an accelerator pedal (not shown), a vehicle speed, and an operation position of a running switch lever 42 serving as an operating portion are input into the controller 70, from an accelerator pedal sensor 38 (FIG. 1), a vehicle speed sensor (not shown), and a lever position sensor 40.

The running switch lever 42 is called a shift lever, and is configured to be able to instruct, by operation, changeover to any one of a plurality operation positions including an N position, a D position, and an R position. An N range that is selected by operating the running switch lever 42 to the N position is a neutral range cutting off a power transmission path between a power source of the vehicle 10 and the wheel assemblies 34. A D range mode that is selected by operating the running switch lever 42 to the D position is a forward running mode in which a power to move the vehicle 10 forward is transmitted to the wheel assemblies 34. An R range mode that is selected by operating the running switch lever 42 to the R position is a rearward running mode in which a power to move the vehicle 10 rearward is transmitted to the wheel assemblies 34. As the operating portion except for the running switch lever 42, for example, a switch or a dial configured to be able to instruct, by operation, changeover to any one of the plurality operation positions including the D position and the R position may be used.

As illustrated in FIG. 1, the controller 70 includes a motor control portion 72, an actual temperature estimation portion 74, a storage portion 76, and a drive restriction portion 78. The motor control portion 72 calculates a torque command value Tri, which is a torque value of the second MG 14 (or the first MG 24) based on the detection signal from the accelerator pedal sensor 38 and the detection signal from the vehicle speed sensor. The motor control portion 72 then outputs a control signal to the inverter 22 (or 26) according to the torque command value Tri, and controls switching of the switching elements according to the control signal. Hereby, driving of the second MG 14 (or the first MG 24) is controlled. By the driving of the second MG 14, the vehicle 10 runs in a forward direction or a rearward direction selected by the running switch lever 42. The actual temperature estimation portion 74, the storage portion 76, and the drive restriction portion 78 will be described later.

Figure 3:
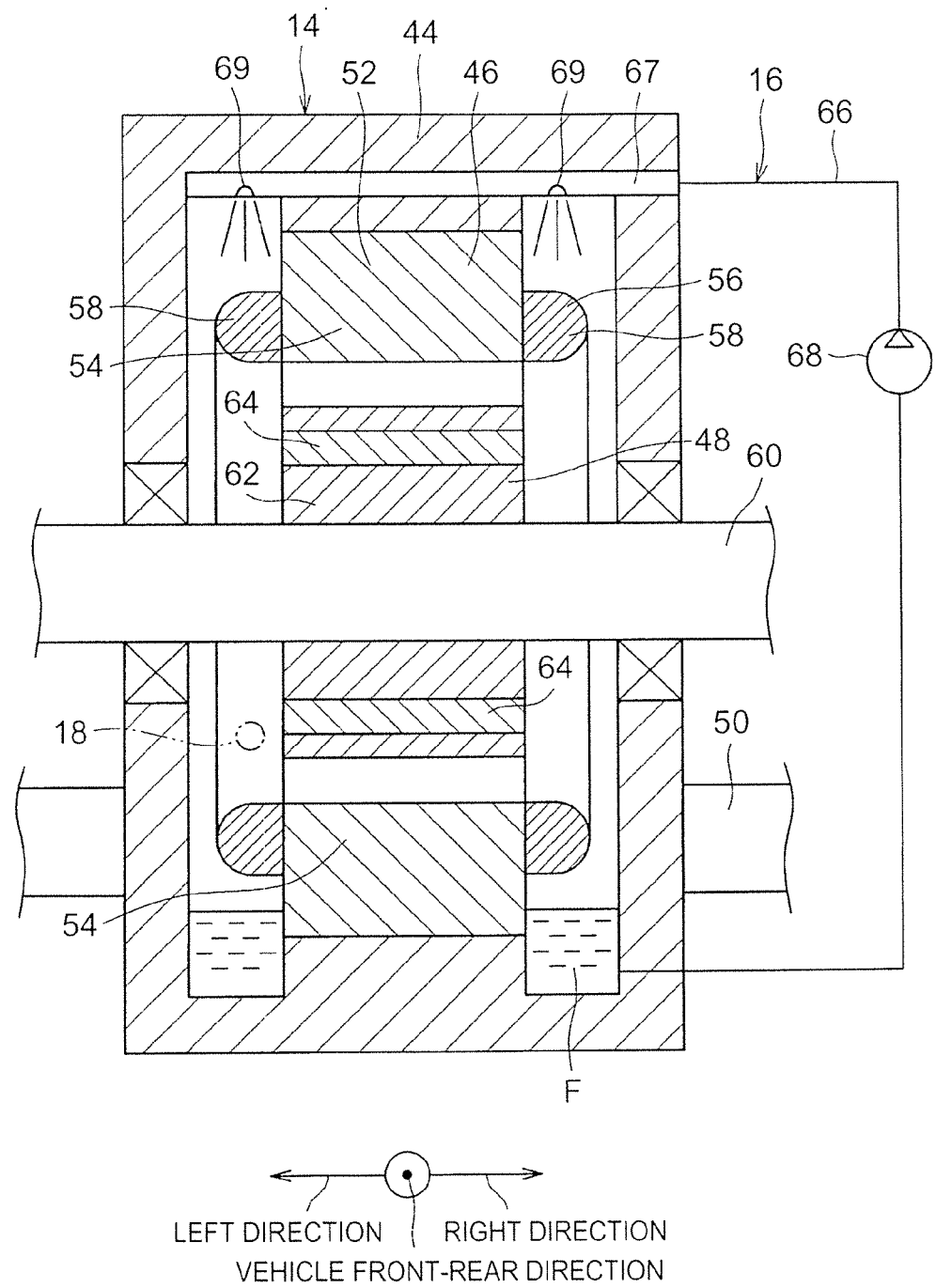
FIG. 3 is a view illustrating a section taken along a line A-A in FIG. 1, and illustrates a configuration of a cooler.

FIG. 3 illustrates a section of the second MG 14 taken along a line A-A in FIG. 1 and a configuration of the cooler 16. The second MG 14 includes a case 44, a stator 46 fixed an inner side of the case 44, and a rotor 48 placed on a radially inner side of the stator 46 so as to be opposed thereto. The case 44 is fixed to a frame 50 constituting the vehicle body 19 of the vehicle 10 via a transaxle case and a mount device (not shown). The transaxle case accommodates therein the first MG 24, the second MG 14, and the power distribution mechanism 28 so as to fix the first MG 24 and the case 44 of the first MG 24. The stator 46 may be fixed to the transaxle case not via the case 44.

The stator 46 includes stator coils 56 of a plurality of phases, for example, three phases, which are wound by concentrated winding or distributed winding around a plurality of salient poles 54 provided on an inner circumferential side of a stator core 52 made from a magnetic material. In the stator coil 56 of each phase, paired coil ends 58 are formed from respective parts projecting outwardly from axial ends of the stator core 52.

The rotor 48 is fixed to an outer side of a rotating shaft 60 rotatably supported by the case 44. The rotor 48 includes a rotor core 62 made from a magnetic material, and permanent magnets 64 placed at several spots on the rotor core 62 and having a magnetic property of the N pole or the S pole in a radial direction or in a direction inclined to the radial direction. The rotating shaft 60 is placed along a right-left direction of the vehicle.

A basic configuration of the first MG 24 (FIG. 2) is similar to the second MG 14. In FIG. 2, a rotating shaft of the first MG 24 is illustrated so as to be placed along a vehicle longitudinal direction, but actually, the rotating shaft of the first MG 24 is placed along the right-left direction of the vehicle 10, similarly to the second MG 14.

Referring back to FIG. 3, the cooler 16 includes a refrigerant passage 66 provided outside the case 44, and a refrigerant pipe 67 connected to the refrigerant passage 66 and provided inside an upper end of the case 44. As illustrated in FIG. 1, the refrigerant pipe 67 is provided vertically above the rotating shaft 60 in a front-rear direction of the vehicle 10.

The refrigerant passage 66 includes a refrigerant pump 68, so that the refrigerant passage 66 is able to supply refrigerant F to the refrigerant pipe 67 in a circulating manner by drawing up the refrigerant F accumulated in a lower part of the case 44. The refrigerant pipe 67 includes injection outlets 69 provided on both ends thereof and configured to inject the refrigerant downward. One end (a left end in FIG. 3) of the refrigerant pipe 67 is closed. The cooler 16 is able to inject the refrigerant toward an upper side of each of the coil ends 58 from each of the injection outlets 69. Hereby, the refrigerant thus injected flows downward and makes contact with the coil ends 58, thereby cooling off the stator coil 56.

The refrigerant used herein is oil called ATF (Automatic transmission fluid), for example, but cooling water may be used as the refrigerant. The cooler 16 may be provided with a heat exchanging portion for cooling, so as to effectively cool down the refrigerant. The heat exchanging for cooling performs heat exchange between air flowing outside the cooler and the refrigerant flowing inside the cooler so as to cool down the refrigerant.

The temperature sensor 18 is provided below the injection outlet 69 so as to perform measurement on a vicinal area of that part of the coil end 58 with which the refrigerant injected from the injection outlet 69 makes contact. The temperature sensor 18 used herein is a thermistor, for example. As illustrated in FIG. 1, when the second MG 14 is viewed along an axial direction of the rotating shaft 60, the temperature sensor 18 is provided closer to a vehicle front side relative to the rotating shaft 60. The temperature sensor 18 may be provided closer to a vehicle rear side relative to the rotating shaft 60, or may be provided vertically below the rotating shaft 60. A signal indicative of a measured value of the temperature sensor 18 is input into the controller 70.

Since the cooler 16 and the temperature sensor 18 are fixed to the vehicle body 19 via the case 44 of the second MG 14, if an orientation of a posture of the vehicle body 19 is changed from a "predetermined reference posture," positions (a posture difference) of the cooler 16 and a part to be measured by the temperature sensor 18 are changed.

In FIG. 1, the second MG 14 is provided in the predetermined reference posture. Here, the "predetermined reference posture" is a vehicle-body posture set in advance such that, when the vehicle 10 is placed on a horizontal plane, the vehicle body is not inclined on design in a standstill state in which no occupant gets in the vehicle 10. In this case, the refrigerant injected from the refrigerant pipe 67 flows downward in the case 44 generally equally toward front and rear directions (right and left directions of FIG. 1).

Figure 4:
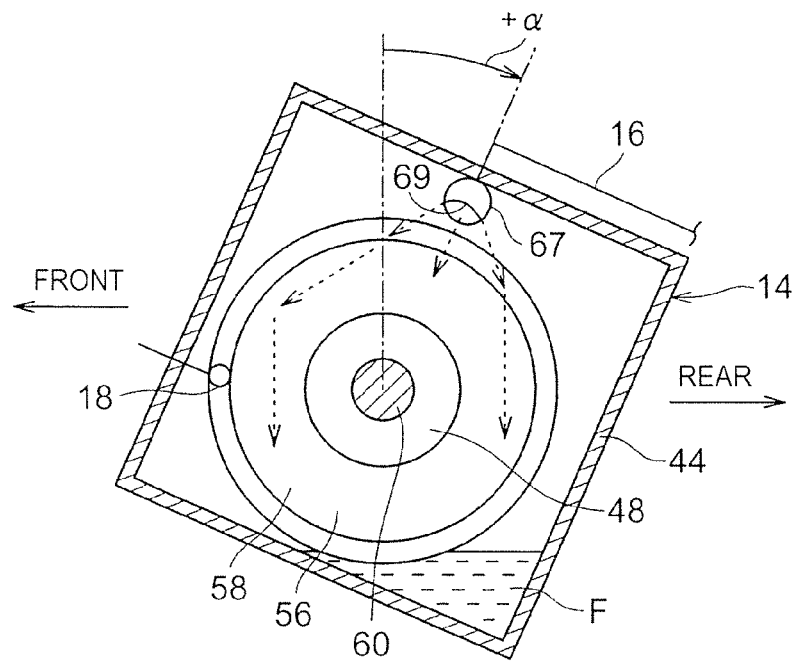
FIG. 4 is a sectional view illustrating a state where a rotary electric machine constituting the rotary-electric-machine temperature estimation system of FIG. 1 is tilted backward.

In the meantime, FIG. 4 illustrates a backward tilting state in which the second MG 14 is tilted backward and downward. In a case where the posture is changed so that the vehicle body 19 is tilted backward as illustrated at the lower left in FIG. 1, positions of the refrigerant pipe 67 and the temperature sensor 18 are changed due to backward and downward tilting of the case 44 fixed to the vehicle body 19, as illustrated in FIG. 4. In FIG. 4, a counterclockwise gradient to the predetermined reference posture is shown as "+α."

Figure 5:
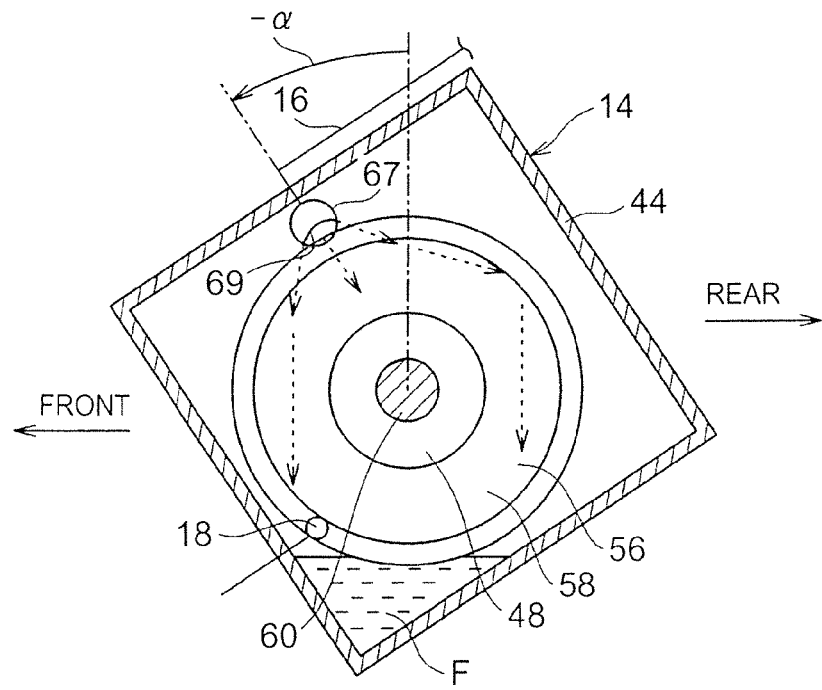
FIG. 5 is a sectional view illustrating a state where the rotary electric machine constituting the rotary-electric-machine temperature estimation system of FIG. 1 is tilted forward.

FIG. 5 illustrates a forward tilting state in which the second MG 14 is tilted forward and downward. In a case where the posture is changed so that the vehicle body 19 is tilted forward as illustrated at the lower center in FIG. 1, the positions of the refrigerant pipe 67 and the temperature sensor 18 are changed due to forward and downward tilting of the case 44 fixed to the vehicle body 19, as illustrated in FIG. 5. In FIG. 5, a clockwise gradient to the predetermined reference posture is shown as "−α."

Referring back to FIG. 1, the controller 70 changes a temperature correction value $\Delta Tna$, $\Delta Tnb$ to be used for an actual temperature estimation of the stator coil 56 according to a change in the posture of the vehicle body 19.

More specifically, the storage portion 76 illustrated in FIG. 1 stores therein data of a first map M1 for a case where the orientation of the posture of the vehicle body 19 is a backward-tilting direction, and data of a second map M2 for a case where the orientation of the posture of the vehicle body 19 is a forward-tilting direction.

FIG. 6 illustrates the first map M1. The first map M1 defines a relationship among a variation ( . . . −A2, −A1, 0, A1, A2 . . . ) in measured temperature of the temperature sensor 18 in a preset unit time interval (t2−t1), a torque command value Tri (=B1, B2, B3 . . . ) of the second MG 14, and a preset temperature correction value $\Delta Tna$. As the torque command value Tri, only positive values are set. Values of $\Delta Tna$ at which either one or both of the torque command value and the measured temperature variation is/are different may be the same or different from each other.

In the first map M1, the temperature correction values $\Delta Tna$ corresponding to the variations ( . . . −A2, −A1, 0, A1, A2 . . . ) in measured temperature of the temperature sensor 18 in the preset unit time interval (t2−t1) and the torque command values Tri of the second MG 14 are set by experiments or the like performed in advance.

FIG. 7 illustrates the second map M2. The second map M2 defines a temperature correction value $\Delta Tnb$ instead of the temperature correction value $\Delta Tna$. The second map M2 defines cases where the torque command value Tri is 0 and negative values (−B1, −B2, −B3 . . . ).

In the first map M1 and the second map M2, some values of the temperature correction values $\Delta Tna$, $\Delta Tnb$ may be the same. $\Delta Tna$, $\Delta Tnb$ may have a negative value or zero, as well as a positive value. The first map M1 and the second map M2 may be changed according to a type of a vehicle. For example, values of the first map M1 and the second map M2 may be changed according to a difference in empty weight of a vehicle.

$\Delta Tna$, $\Delta Tnb$ indicate an increase or decrease amount of a value (Tcoil−Tthm) obtained by deducting a measured temperature Tthm of the temperature sensor 18 from an actual temperature Tcoil of the coil end 58 of the second MG 14, in the unit time interval (t2−t1).

The actual temperature estimation portion 74 acquires that torque command value Tri of the second MG 14 which indicates whether the orientation of the posture of the vehicle body 19 is the backward-tilting direction or the forward-tilting direction. The actual temperature estimation portion 74 estimates an actual temperature of the stator coil 56 according to a change in the torque command value Tri at the time when the torque command value Tri thus acquired is a positive value and a change in the torque command value Tri at the time when the torque command value Tri thus acquired is a negative value. Here, the change in the torque command value Tri indicates a change in the posture of the vehicle body 19 between the backward-tilting direction and the forward-tilting direction. More specifically, the actual temperature estimation portion 74 acquires that torque command value Tri of the second MG 14 which is calculated by the motor control portion 72. In a case where the torque command value Tri is a positive value, when acceleration of the vehicle becomes large, a spring of a suspension device that supports rear wheel assemblies is contracted, so that the vehicle body 19 is tilted backward as illustrated at the lower left in FIG. 1. A degree of the backward tilting tends to increase as a torque is increased in a positive direction. In a case where the torque command value Tri is a positive value indicative of backward tilting of the vehicle body 19, the actual temperature estimation portion 74 selects the first map M1 for backward tilting, and calculates a temperature correction value ΔTna based on the torque command value Tri and a variation in measured temperature of the temperature sensor 18 in the unit time interval (t2−t1) with reference to the data of the first map M1.

In the meantime, in a case where the torque command value Tri is a negative value, when rearward acceleration of the vehicle becomes large, a spring of a suspension device that supports front wheel assemblies is contracted, so that the vehicle body 19 is tilted forward as illustrated at the lower center in FIG. 1. A degree of the forward tilting tends to increase as a torque is increased in a negative direction. In a case where the torque command value Tri is a negative value indicative of forward tilting of the vehicle body 19, the actual temperature estimation portion 74 selects the second map M2 for forward tilting, and calculates a temperature correction value ΔTnb based on the torque command value Tri and a variation in measured temperature of the temperature sensor 18 in the unit time interval (t2−t1) with reference to the data of the second map M2. In a case where the torque command value Tri is zero, the temperature correction value may be calculated with the use of either of the first map M1 and the second map M2. In view of this, the first map M1 may set a case where the torque command value Tri is zero.

The actual temperature estimation portion 74 calculates an actual temperature estimate Tcest of the stator coil 56 by use of the temperature correction value ΔTna, ΔTnb thus calculated and a measured temperature Tthm of the temperature sensor 18. Hereby, an actual temperature of the stator coil 56 is estimated.

In this case, the actual temperature estimation portion 74 adds, to the measured temperature Tthm, a total sum of one or more temperature correction values ΔTna, ΔTnb found in this time interval (t2−t1), thereby calculating the actual temperature estimate Tcest. More specifically, the actual temperature estimate Tcest is found according to the following formula:

$$Tcest = Tthm + \Sigma(\Delta Tna, \Delta Tnb) + Tia \quad (1)$$

In this case, Σ(ΔTna, ΔTnb) indicates a total sum of temperature correction values ΔTna, ΔTnb, and Tia indicates an initial divergence temperature that is a difference between the actual temperature and the estimated temperature of the stator coil 56 of the second MG 14 at an initial time point of measurement. The "initial divergence temperature" is set in advance according to a type of a vehicle. For example, it is also possible to change the initial divergence temperature according to empty weight of a vehicle. The initial divergence temperature Tia may be set to zero. The initial divergence temperature may be added to the calculation of the formula (1) from a time point when a predetermined condition is established. Further, the temperature estimation of the stator coil 56 may be performed only in a case where the actual temperature estimate Tcest is within a predetermined range and {Σ(ΔTna, ΔTnb)+Tia} is within a predetermined range, and thus, upper limits and lower limits may be set for Tcest and {Σ(ΔTna, ΔTnb)+Tia}. Further, the calculation of the actual temperature estimate Tcest may be started only if a predetermined time has elapsed after a starting switch (not shown) provided in the vehicle is turned on.

Further, a temperature correction value corresponding to a measured temperature variation and a torque Tri that are not set in FIGS. 6, 7 can be calculated by linear interpolation based on measured temperature variations that sandwich the measured temperature variation thus not set herein or torques Tri that sandwich the torque Tri thus not set herein.

The drive restriction portion 78 of FIG. 1 is configured such that when the actual temperature estimate Tcest of the second MG 14 is less than a given threshold value Tk ° C., the drive restriction portion 78 assumes a load factor as 100% so as not to restrict a torque command value of the second MG 14, and causes the motor control portion 72 to control driving of the second MG 14 by use of a value of the torque command value without any change. In the meantime, when the actual temperature estimate Tcest of the second MG 14 is the threshold value Tk ° C. or more, the drive restriction portion 78 gradually decreases the load factor from 100% in a linear or curved manner according to an increase of Tcest, so as to restrict the torque command value of the second MG 14 to be decreased gradually. In this case, the drive restriction portion 78 causes the motor control portion 72 to control driving of the second MG 14 by use a torque command value obtained after the restriction. This makes it possible to achieve protection with respect to a temperature increase of the second MG 14.

Figure 8:
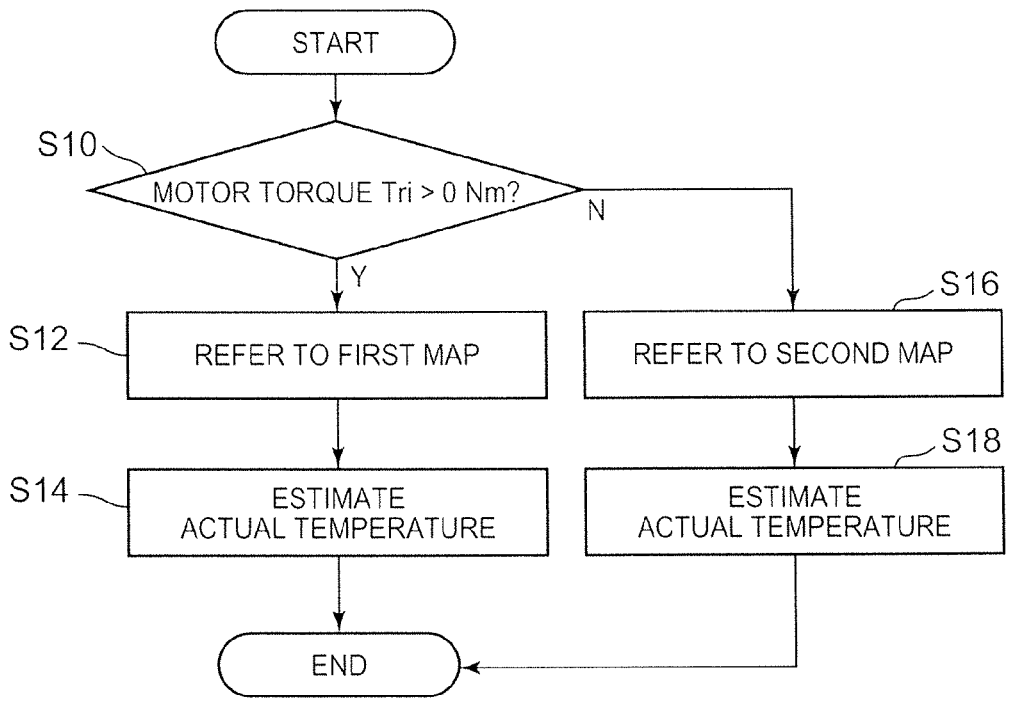
FIG. 8 is a flow chart illustrating an estimating method of a coil actual temperature in the rotary-electric-machine temperature estimation system of FIG. 1.

A method for estimating an actual temperature of the second MG 14 by use of such a temperature estimation system 12 is performed as follows. FIG. 8 is a flow chart illustrating an estimating method of a coil actual temperature in the temperature estimation system. The flowchart may be performed by execution of a program stored in the controller 70. In step S10 (hereinafter, step S is just referred to as "S"), the actual temperature estimation portion 74 determines whether or not the torque command value Tri of the second MG 14 is larger than 0 Nm. When the torque command value Tri is larger than 0 Nm, the actual temperature estimation portion 74 refers to the first map M1 in S12, and estimates an actual temperature of the stator coil 56 in the predetermined reference posture of the vehicle body 19 in S14.

In this case, as will be described later with reference to FIG. 9, for example, those measured temperatures T1, T2 of the stator coil 56 which are measured by the temperature sensor 18 are acquired at times t1, t2 (t1<t2) at every preset unit time interval, so as to find a variation (T2−T1) between the measured temperatures of the temperature sensor 18.

Further, the actual temperature estimation portion 74 acquires a temperature correction value ΔTna with reference to the data of the first map M1 stored in the storage portion 76 based on a torque command value Tri of the second MG 14 at the time t1 and the variation (T2−T1) between the measured temperatures of the temperature sensor 18. The actual temperature estimation portion 74 corrects the measured temperature Tthm (=T2) at the time t2 by use of the temperature correction value ΔTna. In this case, the actual temperature estimation portion 74 calculates an actual temperature estimate Tcest by use of the formula (1).

Meanwhile, when the torque command value Tri of the second MG 14 is 0 Nm or less in S10, the actual temperature estimation portion 74 refers to the second map M2 in S16, and estimates an actual temperature of the stator coil 56 in S18. A calculation method at this time is the same as the case of S14 except that the second map M2 is used.

According to the temperature estimation system 12, the temperature correction value ΔTna, ΔTnb is changed according to a change in an acquisition value indicative of the orientation of the posture of the vehicle body 19. This makes it possible to improve estimation accuracy of an actual temperature of the stator coil 56 in a case where the vehicle body 19 is tilted.

For example, as illustrated in FIG. 4, when the vehicle body 19 is tilted backward, the refrigerant pipe 67 moves backward. Accordingly, the refrigerant injected from the refrigerant pipe 67 largely flows toward a rear side of the stator coil 56, so that an amount of the refrigerant flowing toward a front side thereof is reduced. Accordingly, as compared with the second MG 14 in the predetermined reference posture in FIG. 1, a contact state between the refrigerant injected from the refrigerant pipe 67 and a part to be measured by the temperature sensor 18 is changed. Further, a contact path in which the refrigerant is injected from the refrigerant pipe 67 and makes contact with the part to be measured by the temperature sensor 18 is changed. In this case, a temperature at that part of the stator coil 56 which is measured by the temperature sensor 18 is generally increased as compared with the case of the predetermined reference posture.

In the meantime, as illustrated in FIG. 5, in a case where the vehicle body 19 is tilted forward, the refrigerant injected from the refrigerant pipe 67 largely flows toward the front side of the stator coil 56, so that an amount of the refrigerant flowing toward the rear side thereof is reduced. Even in this case, as compared with the second MG 14 in the predetermined reference posture in FIG. 1, the contact state between the refrigerant injected from the refrigerant pipe 67 and the part to be measured by the temperature sensor 18 is changed, and the contact path of the refrigerant to make contact with the part to be measured by the temperature sensor 18 is changed. In this case, a temperature at that part of the stator coil 56 which is measured by the temperature sensor 18 is generally decreased as compared with the case of the predetermined reference posture.

As described above, by calculating the temperature correction value ΔTna by use of different maps M1, M2 for backward tilting and for forward tilting, it is possible to correct a temperature change at the part to be measured by the temperature sensor 18 which temperature change is caused due to a change of the posture of the vehicle body 19, thereby making it possible to improve estimation accuracy of the actual temperature of the stator coil 56.

Further, the actual temperature estimation portion 74 selects one map M1 (or M2) from a plurality of maps M1, M2 according to an acquisition value of the torque command value indicative of whether the orientation of the posture of the vehicle body 19 is the backward-tilting direction or the forward-tilting direction, and calculates the temperature correction value ΔTna (or ΔTnb) from the torque command value and a variation in measured temperature of the temperature sensor 18, with reference to the data of the selected map. Then, the actual temperature estimation portion 74 estimates an actual temperature of the stator coil 56 by use of the measured temperature and the temperature correction value. Accordingly, it is possible to use a temperature correction value suitable for a degree of tilting of the posture of the vehicle body 19 according to a magnitude of a torque command, thereby making it possible to further increase estimation accuracy of the actual temperature of the stator coil 56.

In such a configuration, even in cases other than a case where the vehicle is placed on a flat path of a horizontal ground, it is possible to improve estimation accuracy of the actual temperature of the stator coil 56. For example, in a case where the vehicle is on an uphill road, the vehicle body 19 is tilted backward relative to the predetermined reference posture, so that the torque value of the second MG 14 at the time of running is increased generally. In this case, as a gradient of a slope is increased and the vehicle body 19 is tilted more, the torque value of the second MG 14 tends to be increased. In contrast, in a case where the vehicle is on a downhill road, the vehicle body 19 is tilted forward relative to the predetermined reference posture, so that the torque value of the second MG 14 at the time of running is decreased generally. In this case, as a gradient of a slope is increased and the vehicle body 19 is tilted more, the torque value of the second MG 14 tends to be decreased. Even in a case where the vehicle body 19 is placed on an inclined surface, with the use of the map in which the temperature correction value is set according to the torque command value, it is possible to estimate an actual temperature of the stator coil 56 with high accuracy.

Figure 9:
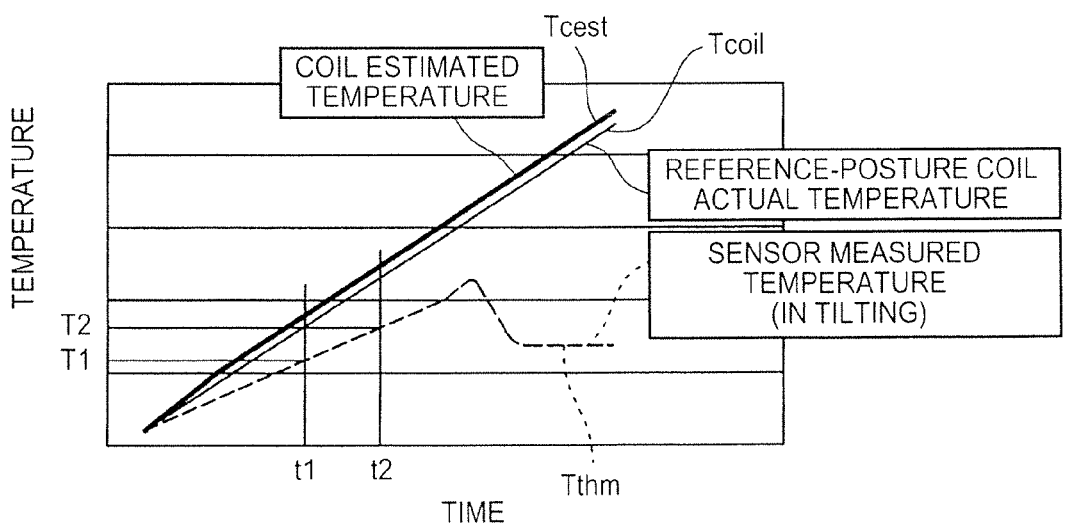
FIG. 9 is a view illustrating a relationship among a sensor measured temperature at the time when a vehicle body is inclined, a coil actual temperature in a predetermined reference posture, and a coil estimated temperature, in the embodiment of the present invention.

FIG. 9 is a view to confirm an effect of the present embodiment, and illustrates one exemplary time-dependent changes of the measured temperature Tthm of the temperature sensor 18 at the time when the vehicle body is tilted, the actual temperature Tcoil of the stator coil 56 of the second MG 14, and the actual temperature estimate Tcest of the stator coil 56. As illustrated in FIG. 9, in the present embodiment, even in a case where the measured temperature Tthm of the temperature sensor 18 is not simply increased according to time course due to tilting of the vehicle body 19, it is possible to estimate, as the actual temperature estimate Tcest, a value that is generally the same as the actual temperature Tcoil in the predetermined reference posture.

Note that, differently from the cases of FIG. 1, FIG. 3, a gear wheel constituting a power transmission device may be provided in the case 44 of the second MG 14, so that oil as the refrigerant accumulated in the lower part of the case 44 is brought upward by the gear wheel and the oil is supplied to a refrigerant supply portion (not shown) provided in the upper part of the case 44. In this case, the refrigerant supply portion serves as the cooler so as to inject the refrigerant from the injection outlets to supply the oil to each of the coil ends 58, thereby cooling off the stator coil 56.

Figure 10:
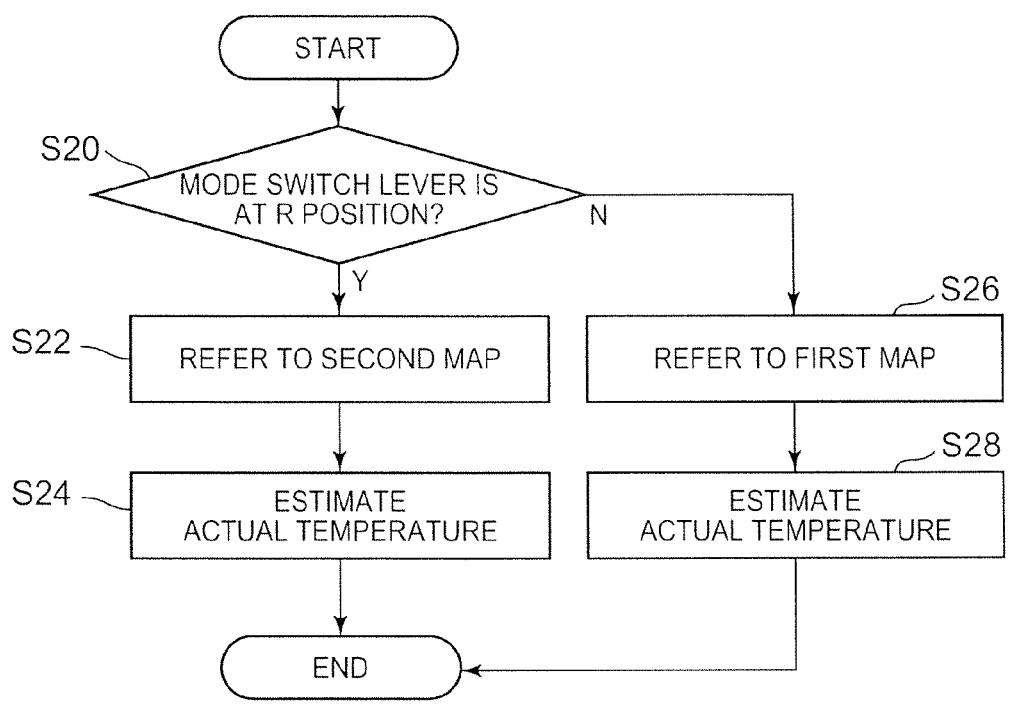
FIG. 10 is a flow chart illustrating a temperature estimating method in another exemplary rotary-electric-machine temperature estimation system according to the embodiment of the present invention.

FIG. 10 is a flow chart illustrating a temperature estimating method in another exemplary rotary-electric-machine temperature estimation system according to the embodiment of the present invention. In this example, an actual temperature estimation portion 74 acquires a detection value of an operation position of a running switch lever 42. The actual temperature estimation portion 74 acquires the detection value of the operation position of the running switch lever 42, as an acquisition value indicative of whether an orientation of a posture of a vehicle body 19 is a backward-tilting direction or a forward-tilting direction. Then, the actual temperature estimation portion 74 changes a temperature correction value by selecting one map M1 (or M2) from a plurality of maps M1, M2 stored in a storage portion 76, according to a change in the operation position. For example, in a case where the detection value of the operation position of the running switch lever 42 indicates an R position that instructs a rearward running of the vehicle, the actual temperature estimation portion 74 selects a second map M2 for forward tilting from the maps stored in the storage portion 76. On the other hand, in a case where the detection value of the operation position of the running switch lever 42 indicates other positions except for the R position, for example, in a case where the detection value indicates a D position that instructs forward running of the vehicle, the actual temperature estimation portion 74 selects a first map M1 for backward tilting from the maps stored in the storage portion 76.

The actual temperature estimation portion 74 calculates a temperature correction value $\Delta Tna$ (or $\Delta Tnb$) from a torque command value and a variation in measured temperature of a temperature sensor 18, with reference to data of the selected map, and calculates an actual temperature estimate Tcest of a stator coil 56 by use of the measured temperature and the temperature correction value, so as to estimate an actual temperature.

In FIG. 10, the actual temperature estimation portion 74 determines whether or not the detection value of the operation position of the running switch lever 42 indicates the R position in S20. In a case of the R position, the actual temperature estimation portion 74 refers to the second map M2 in S22, and estimates an actual temperature of the stator coil 56 in a predetermined reference posture of a vehicle body 19 in S24. On the other hand, in a case where the detection value of the operation position of the running switch lever 42 indicates other positions except for the R position in S20, the actual temperature estimation portion 74 refers to the first map M1 in S26, and estimates an actual temperature of the stator coil 56 in S28.

Even in a case of the above configuration, similarly to the configuration in FIGS. 1 to 9, it is possible to improve estimation accuracy of the actual temperature of the stator coil in a case where the vehicle body 19 is tilted. Other configurations and effects are the same as in the configuration of FIGS. 1 to 9.

Note that in the above embodiment, instead of using the maps, the actual temperature estimation portion 74 may calculate a temperature correction value by use of a different relational expression defining a relationship among a torque value, a variation in measured temperature of the temperature sensor 18, and a temperature correction value, according to an acquisition value indicative of the orientation of the posture of the vehicle body 19. In this case, when the acquisition value indicates backward tilting of the vehicle body 19, the temperature correction value is calculated by use of a first relational expression for backward tilting, and when the acquisition value indicates forward tilting of the vehicle body 19, the temperature correction value is calculated by use of a second relational expression for forward tilting. The actual temperature estimation portion calculates an actual temperature estimate Tcest of the stator coil in the predetermined reference posture of the vehicle body 19 by use of the temperature correction value thus calculated, the measured temperature of the temperature sensor 18, and the formula (1). Similarly to the first map and the second map, the first relational expression and the second relational expression each define a relationship among a variation in measured temperature of the temperature sensor 18 in a preset unit time interval, a torque command value of the second MG 14, and a preset temperature correction value.

Further, in the above description, the same maps are used regardless of whether the second MG 14 is locked or not. However, as another exemplary configuration, the actual temperature of the stator coil of the second MG 14 may be estimated by use of different maps depending on whether or not the second MG 14 is locked. In this case, the storage portion stores therein a "normal-time map" and a "lock-time map" for each of the first map and the second map. The "normal-time map" defines a relationship among a variation in measured temperature of the temperature sensor 18 in a preset unit time interval, a torque command value of the second MG 14, and a preset temperature correction value in a normal time when the second MG 14 is not locked. The "lock-time map" defines a relationship among a variation in measured temperature of the temperature sensor 18 in a preset unit time interval, a torque command value of the second MG 14, and a temperature correction value in a lock time when the second MG 14 is locked, that is, at the time when the second MG 14 stops rotating in a current application state. According to such a configuration, different maps are used for the normal time and for the lock time, thereby making it possible to estimate the actual temperature of the second MG 14 more accurately.

The embodiment of the present invention has been explained as above, but it is needless to say that the present invention is not limited to the above embodiment and is performable in various embodiments as long as modified embodiments are not beyond the gist of the present invention. For example, the above description deals with a case where the torque value of the rotary electric machine or the detection value of the operation position of the running switch lever is used as an acquisition value indicative of the orientation of the posture of the vehicle body 19. However, a gradient of the vehicle body 19 with respect to the predetermined reference posture may be detected by a gradient sensor provided in the vehicle, so that a detection value of the gradient sensor may be used as the acquisition value indicative of the orientation of the posture of the vehicle body 19.

Further, the above description deals with a case where an actual temperature of the second MG 14 is estimated. However, an actual temperature of the stator coil of the first MG 24 instead of the second MG 14, or the actual temperature of the stator coil of the first MG 24 as well as the second MG 14 can be estimated by use of the temperature sensor provided in the first MG 24. In this case, the detection value of the gradient sensor may be used as the acquisition value indicative of the orientation of the posture of the vehicle body 19.

Further, the above description deals with a case where the actual temperature estimation portion 74 uses a torque command value of the second MG 14 as the "torque value of the rotary electric machine." However, a torque sensor configured to measure a torque of the second MG 14 may be provided in the temperature estimation system 12, and the actual temperature estimation portion 74 may use a detection value of the torque sensor as the "torque value of the rotary electric machine."

Further, the above description deals with a case where the temperature correction value is changed by use of the acquisition value indicative of whether the vehicle body 19 is tilted forward or backward. However, such a configuration may be employed that an acquisition value indicative of whether or not a right side of the vehicle body 19 is tilted downward or a left side thereof is tilted downward with respect to a center of the vehicle body 19 in the right-left direction is used to change the temperature correction value. Even in a case where a temperature of the part to be measured by the temperature sensor 18 is changed according to whether the vehicle body 19 is tilted rightward or leftward as such, estimation accuracy of the actual temperature of the stator coil is improved. Even in this case, the detection value of the gradient sensor is used as the acquisition value indicative of the orientation of the posture of the vehicle body 19.

What is claimed is:

1. A rotary-electric-machine temperature estimation system for a vehicle, the temperature estimation system comprising:
   a rotary electric machine fixed to a vehicle body of the vehicle and provided in the vehicle, the rotary electric machine including a stator coil;
   a cooler having an injection outlet that injects refrigerant, the cooler being configured to cool off the stator coil by the refrigerant injected from the injection outlet;
   a temperature sensor that measures a temperature of the stator coil; and
   an electronic control unit operatively connected to the rotary electric machine and the temperature sensor configured to:
   (a) estimate an actual temperature of the stator coil by use of the measured temperature and a preset temperature correction value; and
   (b) change the preset temperature correction value according to a change in a posture of the vehicle body.

2. The temperature estimation system according to claim 1, wherein:
   the electronic control unit is configured to acquire a torque value of the rotary electric machine, and the electronic control unit is configured to change the preset temperature correction value according to a change in the torque value while the torque value is a positive value and according to a change in the torque value while the torque value is a negative value;
   the torque value indicates whether an orientation of the posture of the vehicle body is a backward-tilting direction or a forward-tilting direction; and
   the change in the torque value indicates a change in the posture of the vehicle body between the backward-tilting direction and the forward-tilting direction.

3. The temperature estimation system according to claim 2, wherein the preset temperature correction value is defined according to the torque value and a variation in the measured temperature.

4. The temperature estimation system according to claim 2, wherein
   the electronic control unit is configured to store data of a plurality of maps each indicative of a relationship among a torque value of the rotary electric machine, a variation in the measured temperature, and the preset temperature correction value, the plurality of maps includes a first map and a second map, the first map indicates a relationship among a positive torque value, the variation in the measured temperature, and the preset temperature correction value, and the second map indicates a relationship among a negative torque value including a torque value of zero, the variation in the measured temperature, and the preset temperature correction value, wherein
   the electronic control unit is configured to select one map from the plurality of maps according to a change in the torque value,
   the electronic control unit is configured to calculate the preset temperature correction value based on the torque value and the variation in the measured temperature with reference to data of the map selected, and
   the electronic control unit is configured to estimate an actual temperature of the stator coil in a predetermined reference posture of the vehicle body by use of the measured temperature and the preset temperature correction value.

5. The temperature estimation system according to claim 1, further comprising:
   a shift lever provided in the vehicle, the shift lever being configured to instruct changeover between forward movement and rearward movement of the vehicle by operation, wherein
   the electronic control unit operatively connected to the shift lever, the electronic control unit is configured to acquire an operation position of the shift lever, and the electronic control unit is configured to change the preset temperature correction value according to a change in the operation position;
   the operation position indicates whether an orientation of the posture of the vehicle body is a backward-tilting direction or a forward-tilting direction; and
   the change in the operation position indicates a change in the posture of the vehicle body between the backward-tilting direction and the forward-tilting direction.

6. The temperature estimation system according to claim 5, wherein the preset temperature correction value is defined according to a torque value of the rotary electric machine and a variation in the measured temperature.

7. The temperature estimation system according to claim 5, wherein
   the electronic control unit is configured to store data of a plurality of maps each indicative of a relationship among a torque value of the rotary electric machine, a variation in the measured temperature, and the preset temperature correction value, the plurality of maps includes a first map and a second map, the first map indicates a relationship among a positive torque value, the variation in the measured temperature, and the preset temperature correction value, and the second map indicates a relationship among a negative torque value including a torque value of zero, the variation in the measured temperature, and the preset temperature correction value, wherein
   the electronic control unit is configured to select one map from the plurality of maps according to a change in the operation position,
   the electronic control unit is configured to calculate the preset temperature correction value based on the torque value and the variation in the measured temperature with reference to data of the map selected, and
   the electronic control unit is configured to estimate an actual temperature of the stator coil in a predetermined reference posture of the vehicle body by use of the measured temperature and the preset temperature correction value.

8. The temperature estimation system according to claim 1, wherein
the preset temperature correction value is defined according to a torque value of the rotary electric machine and a variation in the measured temperature.

9. The temperature estimation system according to claim 1, wherein
the electronic control unit is configured to store data of a plurality of maps each indicative of a relationship among a torque value of the rotary electric machine, a variation in the measured temperature, and the preset temperature correction value, the plurality of maps includes a first map and a second map, the first map indicates a relationship among a positive torque value, the variation in the measured temperature, and the preset temperature correction value, and the second map indicates a relationship among a negative torque value including a torque value of zero, the variation in the measured temperature, and the preset temperature correction value, wherein
the electronic control unit is configured to select one map from the plurality of maps according to a change in the vehicle body,
the electronic control unit is configured to calculate the preset temperature correction value based on the torque value and the variation in the measured temperature with reference to data of the map selected, and
the electronic control unit is configured to estimate an actual temperature of the stator coil in a predetermined reference posture of the vehicle body by use of the measured temperature and the preset temperature correction value.

10. The temperature estimation system according to claim 1, wherein
when the actual temperature of the stator coil which is estimated by the electronic control unit is a predetermined temperature or more, the electronic control unit is configured to restrict driving of the rotary electric machine.

11. A rotary-electric-machine temperature estimation system for a vehicle, the temperature estimation system comprising:
a rotary electric machine fixed to a vehicle body of the vehicle and provided in the vehicle, the rotary electric machine including a stator coil;
a cooler having an injection outlet that injects refrigerant, the cooler being configured to cool off the stator coil by the refrigerant injected from the injection outlet;
a temperature sensor that measures a temperature of the stator coil; and
a electronic control unit operatively connected to the rotary electric machine and the temperature sensor, the electronic control unit having data of a plurality of maps each indicative of a relationship among a torque value of the rotary electric machine, a variation in the measured temperature, and a temperature correction value, the plurality of maps including a first map and a second map, the first map being referred to at the time when an orientation of a posture of the vehicle body is a backward-tilting direction, and the second map being referred to at the time when the orientation of the posture of the vehicle body is a forward-tilting direction, the electronic control unit being configured to:
(a) acquire an acquisition value indicative of whether the orientation of the posture of the vehicle body is the backward-tilting direction or the forward-tilting direction, and select one map from the plurality of maps according to the acquisition value,
(b) calculate the temperature correction value based on the torque value and the variation in the measured temperature of the temperature sensor with reference to data of the map selected, and
(c) estimate an actual temperature of the stator coil in a predetermined reference posture of the vehicle body by use of the measured temperature and the temperature correction value.

* * * * *